United States Patent [19]
Sato et al.

[11] Patent Number: 5,851,252
[45] Date of Patent: Dec. 22, 1998

[54] METHOD OF FORMING MOLD RELEASE FILM AND MAKING A GLASS OPTICAL ELEMENT

[75] Inventors: Yasuhiko Sato; Hiroaki Fujita, both of Omiya, Japan

[73] Assignee: Fuji Photo Optical Co. Ltd., Omiya, Japan

[21] Appl. No.: 798,270

[22] Filed: Feb. 11, 1997

[30] Foreign Application Priority Data

Apr. 23, 1996 [JP] Japan ................................. 8-127945

[51] Int. Cl.$^6$ ........................... C03B 11/00; C03B 40/00; C03L 17/00
[52] U.S. Cl. ................................ 65/24; 65/60.6; 65/111; 65/102; 427/165; 427/450; 427/577
[58] Field of Search .............................. 65/24, 26, 30.1, 65/60.1, 60.6, 60.3, 64, 111, 374.15, 102; 427/450, 535, 539, 577, 165

[56] References Cited

U.S. PATENT DOCUMENTS

| | | | |
|---|---|---|---|
| 4,976,764 | 12/1990 | Fujino | .................................. 65/30.1 |
| 5,104,709 | 4/1992 | Kokaku et al. | . |
| 5,125,949 | 6/1992 | Hirota et al. | . |
| 5,168,404 | 12/1992 | Miyazaki et al. | .......................... 65/39 |
| 5,242,775 | 9/1993 | Yamazaki | . |
| 5,340,373 | 8/1994 | Miyazaki et al. | ........................ 65/60.3 |

FOREIGN PATENT DOCUMENTS 62-207726  9/1987  Japan .

OTHER PUBLICATIONS

Jap. Patent Public. No. 4–77321, 11.3.1992, Japan (same as Japanese Patent 7–45329, 5.17. 1995, Japan.

*Primary Examiner*—Steven P. Griffin
*Attorney, Agent, or Firm*—Ronald R. Snider

[57] ABSTRACT

In a method of forming a mold release film on the surface of a glass blank from which an optical element is made by press molding, a carbon film having a thickness of less than 50 angstroms or, preferably, less than 10 angstroms is formed on the surface of the glass blank, thereby improving the releasability of the mold and the molded article with respect to each other. A glass blank (1) is subjected to ashing with an oxygen plasma so as to remove organic dirt attached to the glass blank (1). Then, plasma cleaning with an argon plasma is effected so as to remove inorganic dirt attached to the glass blank (1). Thereafter, the glass blank (1) is subjected to methane plasma processing such that a carbon film (2) having a thickness of less than 50 angstroms is formed on the surface of the glass blank (1) from which the dirt has been removed.

4 Claims, 2 Drawing Sheets

METHOD OF FORMING MOLD RELEASE FILM AND MAKING A GLASS OPTICAL ELEMENT

RELATED APPLICATIONS

This application claims the priority of Japanese Patent Application No. 8-127945 filed on Apr. 23, 1996, which is incorporated herein by reference.

BACKGROUND OF THE INVENTION

1. Field of the Invention

The present invention relates to a method of forming a mold release film and, more specifically, to a method of forming a mold release film on the surface of a glass blank in order to improve releasability of a molded article and a mold with respect to each other in press molding of an optical element such as lens.

2. Description of the Prior Art

Recently, as optical instruments have a higher performance and lighter weight, optical elements having a higher precision have been required. Accordingly, aspherical lenses and the like have been formed by press molding. Performed in this press molding is reheat press technique in which a mold comprising an upper die, a lower die, and a cylindrical die is used and, while heat is applied to the mold in a non-oxidizing atmosphere such as nitrogen gas, a glass blank, which is a material for a lens, is filled between the upper and lower dies so that a lens shape formed in the molding surfaces of the upper and lower dies is transferred to the glass blank, thereby forming the lens, which is a molded article.

In order to obtain a favorable molded article in such press molding of a glass blank, it is necessary to prevent the glass blank and the mold from fusing together, thereby improving the releasability of the molded article and the mold with respect to each other. Accordingly various kinds of methods for forming a mold release film, on a glass blank, which is a molding material, have been proposed in order to prevent the glass blank from fusing to the mold.

For example, Japanese Patent Publication No. 2-31012 discloses a method of forming a carbon film with a thickness of 50 to 5,000 angstroms on the surface of the glass blank. Also, Japanese Patent Publication No. 7-45329 discloses a method of forming a hydrocarbon film on the surface of the glass blank. According to these methods, the mold and the glass blank are prevented from fusing together, whereby the releasability of the molded article and the mold with respect to each other can be improved.

In the method disclosed in the above-mentioned Japanese Patent Publication No. 2-31012, however, since the carbon film is relatively thick, i.e., 50 to 5,000 angstroms, it may remain all the molding surface of the mold as the molding operation is repeated. Layers of such carbon may gradually deposit, thereby changing the shape of the molding surface. When the shape of the molding surface changes, the form of the lens obtained by molding also changes. The optical performance of aspherical lenses, which are designed in the order of sub-micrometers, is adversely affected thereby in particular. Such adverse influence on lenses can be prevented when the carbon film deposited on the molding surface is removed. The operation for removing the carbon film, however, must be frequently performed when the carbon film is thick. In this case, lenses cannot be molded continuously, whereby the productivity of lenses may deteriorate. Also, while it is necessary for the molded article after the molding of the lens to be subjected to an oxygen plasma processing or the like so as to remove the carbon film, such removal is difficult.

Also, in the method disclosed in the above-mentioned Japanese Patent Publication No. 7-45329, it is necessary to remove the hydrocarbon film from the molded article by means of the oxygen plasma processing or the like after the lens is molded. When hydrocarbon and oxygen react with each other, however, steam is generated in addition to carbon monoxide or carbon dioxide. Accordingly, moisture may adhere to the inside of the apparatus for performing the processing for removing the hydrocarbon film, thereby deteriorating the reproducibility of the processing and causing the lens surface to be fogged.

SUMMARY OF THE INVENTION

In view of these circumstances, it is an object of the present invention to provide a method of forming a mold release film, which can improve the releasability of the mold and the glass blank with respect to each other, without deteriorating the productivity of optical elements while generating no moisture when the mold release film is removed.

The method in accordance with the present invention is a method of forming a mold release film on a surface of a glass blank used as a molding material when an optical element is made by press molding, and comprises the step of:

forming a carbon film with a thickness of less than 50 angstroms on the surface of the glass blank.

Preferably, the carbon film has a thickness of less than 10 angstroms.

Preferably, the carbon film is formed after the glass blank is subjected to an ashing processing in an oxygen plasma.

DETAILED DESCRIPTION OF THE PREFERRED EMBODIMENTS

Figure 1:
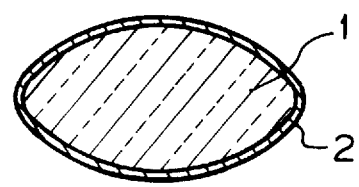
FIG. 1 is a schematic view showing a glass blank on which a carbon film is formed by the method of forming a mold release film in accordance with the present invention.

In the following, an embodiment of the present invention will be explained with reference to the drawings. FIG. 1 is a cross-sectional view showing a glass blank 1 on which a mold release film is formed in accordance with this embodiment. As the glass blank 1 shown in FIG. 1, an optical glass having a refractive index and dispersion value necessary for obtaining a lens with desired optical characteristics is used. This glass blank 1 has a shape and size appropriate far the final form of the lens.

A carbon film 2 is formed on the faces of the glass blank 1 to which an optically functional surface is to be formed, i.e., faces which come into contact with the molding surfaces of the upper and lower dies of a mold which will be explained later. The thickness of the carbon film 2 is less than 50 angstroms and preferably less than 10 angstroms.

Figure 2:
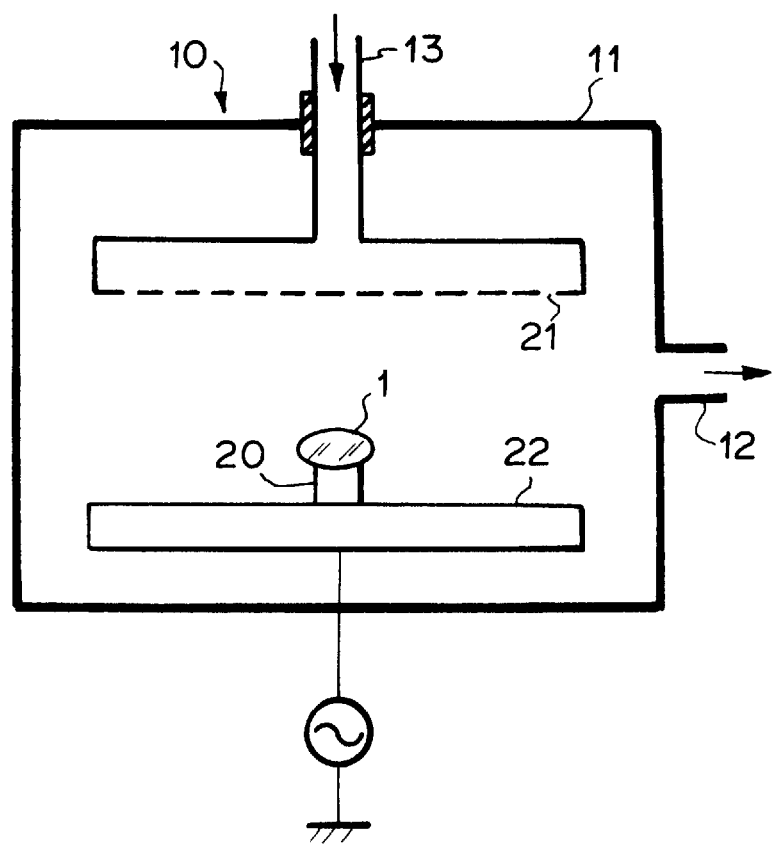
FIG. 2 is a schematic view showing the configuration of a carbon-film forming apparatus for forming a carbon film on a glass blank.

FIG. 2 is a schematic view showing a carbon-film forming apparatus 10 for forming the carbon film 2 on the glass blank 1. As shown in FIG. 2, the carbon-film forming apparatus 10 comprises a vacuum vessel 11, an exhaust outlet 12 formed in the vacuum vessel 11, and a gas inlet 13 for introducing a gas into the vacuum vessel 11. The exhaust outlet 12 is connected to a non-depicted vacuum source, whereas the gas inlet 13 is connected to a non-depicted gas source. Disposed within the vacuum vessel 11 are a blank holder 20 for holding the glass blank 1, and an anode 21 and a cathode 22 for applying a high frequency to the inside of the vacuum vessel 11.

Here, the anode 21 is a porous electrode which has a number of holes in its surface and is grounded together with the vacuum vessel 11. Through these holes, various kinds of gasses are supplied into the vacuum vessel 11.

In the following, a method of forming the carbon film 2 on the surface of the glass blank 1 by means of the carbon-film forming apparatus shown in FIG. 2 will be explained.

First, the glass blank 1, as being held by the blank holder 20, is set at a predetermined position within the vacuum vessel 11. Subsequently, the vacuum vessel 11 is exhausited through the exhaust outlet 12 such that the pressure therein is reduced to about $10^{-4}$ to $10^{-5}$ Torr, and then oxygen gas ($O_2$) is introduced from the gas inlet 13 till the pressure becomes 0.3 Torr. After the introduction of oxygen gas, a high frequency of 400 W is applied between the anode 21 and the cathode 22, thereby forming an oxygen plasma. Then, high-frequency discharge by this oxygen plasma is effected for one minute so as to remove, by ashing, dirt such as organic substances attached to the glass blank 1 which can combine with oxygen.

Thereafter, the introduction of oxygen gas from the gas inlet 13 is stopped, and argon gas (Ar) is introduced into the vacuum vessel 11 from the gas inlet 13 till the pressure becomes 0.3 Torr. After the introduction of argon gas, a high frequency of 400 W is applied between the anode 21 and the cathode 22, thereby forming an argon plasma. Then, high-frequency discharge by this argon plasma is effected for one minute so as to perform plasma cleaning of the glass blank 1, thereby removing dirt such as inorganic substances, e.g. metal, attached to the glass blank 1 which cannot be removed by the oxygen plasma.

After the dirt attached to the glass blank 1 is removed, the introduction of argon gas from the gas inlet 13 is stopped, and methane gas ($CH_4$) is introduced into the vacuum vessel 11 from the gas inlet 13 till the pressure becomes 0.3 Torr. After the introduction of methane gas, a high frequency of 50 W is applied between the anode 21 and the cathode 22, thereby forming a methane plasma. Then, high-frequency discharge by the methane plasma is effected for 30 seconds, thereby forming the carbon film 2 with a thickness of less than 50 angstroms on the surface of the glass blank 1.

The conditions for the oxygen plasma, argon plasma, and methane plasma are shown in the following Table 1.

TABLE 1

|  | Gas pressure (Torr) | Discharge power (W) | Discharge time |
|---|---|---|---|
| Oxygen plasma | 0.3 | 400 | 1 min |
| Argon plasma | 0.3 | 400 | 1 min |
| Methane plasma | 0.3 | 50 | 30 sec |

In the present invention, organic dirt on the glass blank 1 is removed by the oxygen plasma, while inorganic dirt on the glass blank 1 is removed by the argon plasma, whereby the favorable carbon film 2 free of irregularities caused by dirt can be formed on the surface of the glass blank 1.

The glass blank 1 having thus formed carbon film 2 is subjected to press molding as follows.

Figure 3:
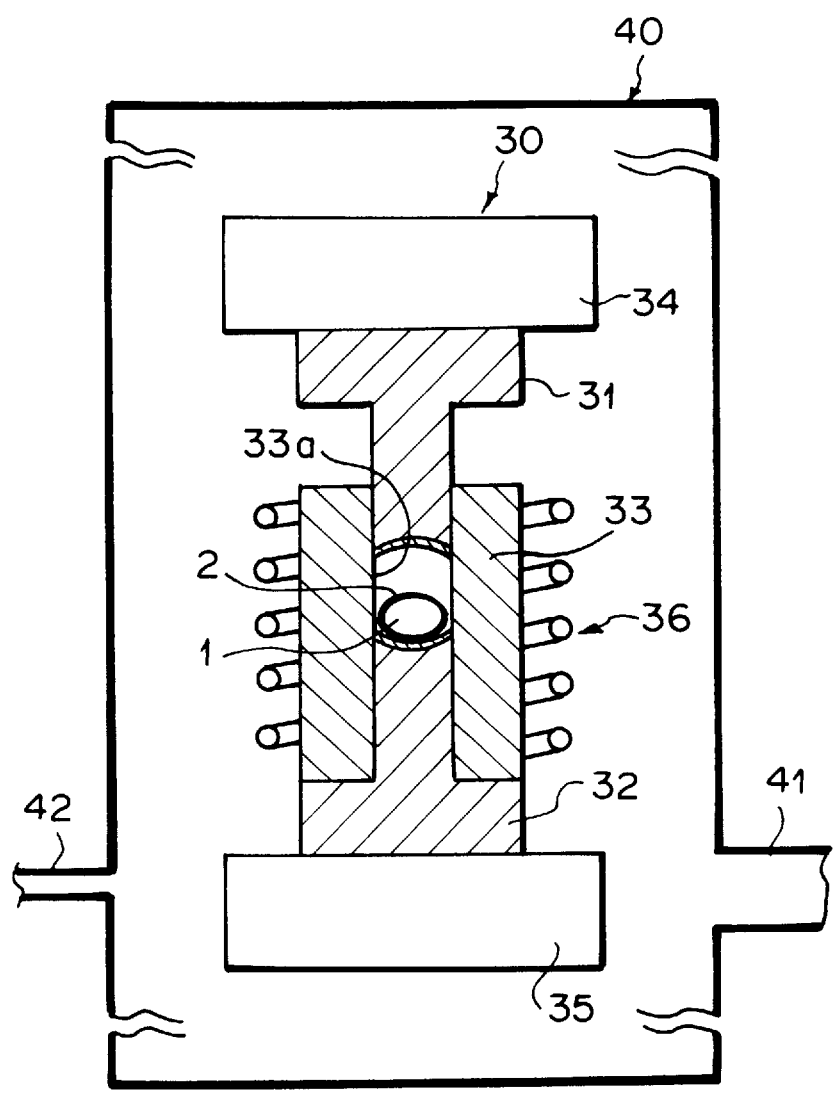
FIG. 3 is a view showing the configuration of a press-molding machine for molding a glass blank.

FIG. 3 is a cross-sectional view showing a schematic configuration of a press-molding machine 30 for molding the glass blank 1 having the carbon film 2. As shown in FIG. 3, the press-molding machine 30 comprises an upper die 31 and a lower die 32 having molding surfaces, which have been precisely mirror-polished in conformity with a desired lens form, and a cylindrical die 33 having a die hole 33$a$ whose inner circumference has been precisely mirror-polished. Here, the upper die 31, lower die 32, and cylindrical die 33 are made of a hard metal such as tungsten carbide. In order to improve the releasability of the molded article and prevent the upper die 31 and the lower die 32 from being oxidized, a TiAlN film (titanium/aluminum nitride film) is formed on the molding surfaces of the upper die 31 and lower die 32. The upper die 31 is fixed to a driving table 34 and is driven by a non-depicted driving unit so as to be inserted into the die hole 33$a$ of the cylindrical die 33 and slide up and down on the inner circumference thereof. On the other hand, the lower die 32 is fixed to a support table 35 so as not to slide against the cylindrical die 33.

An induction heating coil 36 is wound around the cylindrical die 33. As an electric power is supplied to this induction heating coil 36, the cylindrical die 33 is heated to a temperature (500° to 60° C.) which is necessary for molding the glass blank 1. Preferably, a temperature measuring means such as thermocouple is attached to the cylindrical die 33 so as to measuare the temperature of the cylindrical die 33, allowing a desired temperature to be maintained.

The press-molding machine 30 is disposed within a vacuum vessel 40. Formed in the vacuum vessel 40 are an exhaust outlet 41 and a gas inlet 42 for introducing nitrogen gas into the vacuum vessel 40. The exhaust outlet 41 is connected to a non-depicted vacuum source, whereas the gas inlet 42 is connected to a gas source for introducing nitrogen gas into the vacuum vessel 40. Accordingly, nitrogen gas is introduced from the gas inlet 42, whereby the glass blank 1 is molded in a nitrogen atmosphere.

In the following, a method of forming the glass blank 1 by means of the press-molding machine 30 shown in FIG. 3 will be explained.

First, the glass blank 1 is inserted into the die hole 33$a$ of the cylindrical die 33 such that the faces having the carbon film 2 will come into contact with the molding surfaces of the upper die 31 and lower die 32 at the time of molding. Subsequently, the vacuum vessel 40 is exhausted through the exhaust outlet 41, and nitrogen gas is introduced from the gas inlet 42. Thereafter, an electric power is supplied to the induction heating coil 36 so as to heat the cylindrical die 33 to a desired temperature (500° to 600° C.). After the introduction of nitrogen gas, the upper die 31 is driven toward the lower die 32, and the glass blank 1 is held under a predetermined pressure for a predetermined press time. Accordingly, the lens shape formed on the molding surfaces of the upper die 31 and lower die 32 is transferred to the glass blank 1. Here, since the carbon film 2 is formed on the surface of the glass blank 1 while the TiAlN film is formed on the molding surfaces of the upper die 31 and lower die 32, the glass blank 1 and the upper die 31 and lower die 32 are prevented from fusing together.

Thereafter, supply of the electric power to the induction heating coil 36 is stopped, and the cylindrical die 33 is gradually cooled. Then, the upper die 31 is driven upward so as to open the mold, and a lens, which is a molded article, is removed therefrom. Here, since the carbon film 2 is formed on the surface of the glass blank 1 while the TiAlN film is formed on the molding surfaces of the upper die 31 and lower die 32, the molded lens and the upper die 31 and lower die 32 are prevented from fusing together, whereby the lens can be easily released from the upper die 31 and lower die 32.

Here, since the carbon film 2 is attached to the surface thereof, the lens is subjected to plasma processing or annealing so as to remove the carbon film 2 as carbon monoxide or carbon dioxide gas, thereby obtaining the lens as the final product.

The experiments conducted by the inventor, in which the molding surfaces of the upper die 31 and lower die 32 are observed after repeated molding operations of such a lens, have confirmed that the deposition of the carbon film 2 can be greatly reduced. In particular, when the thickness of the carbon film 2 is less than 10 angstroms, hardly any trace of deposited carbon film 2 has been seen.

Thus, in the present invention, since the carbon film 2 having a thickness of less than 50 angstroms or, preferably, less than 10 angstroms is formed on the surface of the glass blank 1, the glass blank 1 and the upper die 31 and lower die 32 are prevented from fusing together, whereby the releasability of the upper die 31 and lower die 32 and the molded article with respect to each other can be improved. Also, since the thickness of the carbon film 2 is less than 50 angstroms, the deposition of the carbon film 2 onto the molding surfaces of the upper die 31 and lower die 32 can be greatly reduced, whereby the number of cleaning operations for the molding surfaces can be reduced and the number of continuous molding operations in the mold can be greatly increased, allowing the productivity of lenses to improve. Since the carbon film 2 can also be easily removed from the molded article in a short time, the productivity of lenses can further be improved. Also, when the carbon film 2 is removed from the molded article, unlike hydrocarbon films, no steam is generated, whereby moisture is prevented from adhering to the inside of the apparatus for removing the carbon film 2 and thereby yielding adverse influences. Further, since the carbon film 2 has a hardness lower than that of hydrocarbon films in general, it can be removed more easily than the hydrocarbon films.

Also, since the dirt attached to the glass blank 1 is removed by the ashing with oxygen plasma and the plasma cleaning with argon plasma before the carbon film 2 is formed on the surface of the glass blank 1, the thin carbon film 2 having a thickness of less than 50 angstroms can be formed on the surface of the glass blank 1 without irregularities caused by the dirt, whereby the lens shape on the molding surfaces can be favorably transferred to the glass blank 1.

Though the respective processing operations with oxygen plasma, argon plasma, and methane plasma are performed under the conditions shown in the above Table 1 in the foregoing embodiment, these conditions can be changed in various ways according to the kind of the glass blank to be molded and the like.

Also, while only the cylindrical die 33 of the press-molding machine 30 is heated in the above-mentioned embodiment, the inside of the vacuum vessel 40 as a whole may be heated.

Further, though only the upper die 31 is driven to mold the glass blank 1 in the above-mentioned embodiment, both of the upper die 31 and lower die 32 or only the lower die 32 may be driven to mold the glass blank 1.

Also, while a lens is molded from the glass blank in the above-mentioned embodiment, the present invention can be applied to cases where various kinds of optical elements such as prism and filter are molded as well.

As explained in detail in the foregoing, in the method of forming a mold release film in accordance with the present invention, since a carbon film having a thickness of less than 50 angstroms or, preferably, less than 10 angstroms is formed on the surface of a glass blank, the deposition of the carbon film onto the molding surfaces of a mold can be greatly reduced, whereby the number of cleaning operations for the molding surfaces can be reduced and the number of continuous molding operations in the mold can be greatly increased, allowing the productivity of optical elements to improve. Further, since the carbon film can also be easily removed from a molded article in a short time, the productivity of optical elements can further be improved. Also, when the carbon film is removed from the molded article, no steam is generated, whereby moisture is prevented from adhering to the inside of the apparatus and thereby deteriorating the reproducibility of processing, generating a fog in the molded article due to steam, and so forth.

Also, since the dirt attached to the glass blank is removed by the ashing with oxygen plasma and the plasma cleaning with argon plasma before the carbon film is formed on the glass blank, the thin carbon film having a thickness of less than 50 angstroms can be formed on the surface of the glass blank without irregularities caused by the dirt, whereby the lens, shape on the molding surfaces can be favorably transferred to the glass blank.

What is claimed is:

1. A method of making an optical element by press molding, said method comprising the steps of:

ashing a glass blank in an oxygen plasma, said glass blank being used as a molding material;

forming a carbon film with a thickness of less than 10 angstroms on the surface of said glass blank; and press molding in a mold said glass blank after forming the carbon film.

2. A method according to claim 1 wherein said step of forming comprises forming a methane plasma by introducing methane gas into a vessel and applying a high frequency at a power level lower than that which causes hydrocarbon depositing, and depositing carbon on said glass blank to form said carbon film.

3. A method in accordance with claim 1 further comprising the step of removing said carbon film after the step of press molding, by oxygen plasma processing after the optical element is molded.

4. A method of forming a mold release film on a surface of a glass blank used as a molding material when an optical element is made by press molding, said method comprising the steps of:

preparing the glass blank by dirt removal;

forming a film consisting of carbon with a thickness of less than 10 Å on the surface of said glass blank; and wherein said forming is by a methane plasma produced by introducing methane gas into a vessel and applying a high frequency at a power level lower than that which causes hydrocarbon depositing, and depositing carbon on said glass blank to form said film.

* * * * *